US008194970B2

(12) United States Patent
Stahlhut et al.

(10) Patent No.: US 8,194,970 B2
(45) Date of Patent: Jun. 5, 2012

(54) METHOD FOR PRODUCING THREE-DIMENSIONALLY STRUCTURED SURFACES

(75) Inventors: Oliver Stahlhut, Wedemark OT Mellendorf (DE); Christian Neumann, Hildesheim (DE); Michael Mäker, Hannover (DE)

(73) Assignee: Benecke-Kaliko AG, Hannover (DE)

( * ) Notice: Subject to any disclaimer, the term of this patent is extended or adjusted under 35 U.S.C. 154(b) by 769 days.

(21) Appl. No.: 12/341,437

(22) Filed: Dec. 22, 2008

(65) Prior Publication Data

US 2009/0157215 A1 Jun. 18, 2009

Related U.S. Application Data

(63) Continuation of application No. PCT/EP2007/054386, filed on May 7, 2007.

(30) Foreign Application Priority Data

Jun. 20, 2006 (DE) ......................... 10 2006 028 239

(51) Int. Cl.
*G06K 9/00* (2006.01)
*G01C 11/12* (2006.01)
*G01P 3/36* (2006.01)

(52) U.S. Cl. ............... 382/152; 382/154; 356/2; 356/27

(58) Field of Classification Search ........................ None
See application file for complete search history.

(56) References Cited

U.S. PATENT DOCUMENTS

| | | | | | |
|---|---|---|---|---|---|
| 4,323,317 | A | * | 4/1982 | Hasegawa | 347/224 |
| 4,422,101 | A | * | 12/1983 | Takei | 358/3.29 |
| 5,886,317 | A | * | 3/1999 | Hinrichs et al. | 219/121.69 |
| 2009/0059239 | A1 | * | 3/2009 | Hoffmann et al. | 356/498 |

FOREIGN PATENT DOCUMENTS

| | | | |
|---|---|---|---|
| DE | 31 29 649 | A1 | 5/1982 |
| DE | 32 30 719 | A1 | 3/1983 |
| DE | 42 13 106 | A1 | 11/1992 |
| DE | 43 26 874 | A1 | 2/1995 |
| DE | 44 41 337 | A1 | 5/1996 |
| EP | 1 493 595 | A2 | 1/2005 |
| GB | 2 105 944 | A | 3/1983 |

OTHER PUBLICATIONS

International Search Report, dated Mar. 13, 2008.

* cited by examiner

*Primary Examiner* — Samir Ahmed
*Assistant Examiner* — Fred Hu
(74) *Attorney, Agent, or Firm* — Laurence A. Greenberg; Werner H. Stemer; Ralph E. Locher

(57) ABSTRACT

A method for producing three-dimensionally structured surfaces of objects, the object surface being created as a reproduction of a three-dimensionally structured original surface with the aid of a machining tool. Accordingly, the topology of the original surface is first determined, a measured depth value being assigned to each surface or grid element, creating a depth map of the original surface. The depth values are evaluated in terms of their influence on the reflective properties of the surface elements and the reflective properties are stored in the form of parameters. The depth values are then modified in accordance with the reflective values and are used as topological data for the electronic control of a machining tool.

16 Claims, No Drawings

METHOD FOR PRODUCING THREE-DIMENSIONALLY STRUCTURED SURFACES

CROSS-REFERENCE TO RELATED APPLICATIONS

This is a continuation, under 35 U.S.C. §120, of copending international application PCT/EP2007/054386, filed May 7, 2007, which designated the United States; this application also claims the priority, under 35 U.S.C. §119, of German patent application DE 10 2006 028 239.6, filed Jun. 20, 2006; the prior applications are herewith incorporated by reference in their entirety.

BACKGROUND OF THE INVENTION

Field of the Invention

The invention relates to a method for producing three-dimensionally structured surfaces of objects, the object surface being generated as a reproduction of a three-dimensionally structured original surface. That is to say a patterned original, with the aid of a machining tool, and in the case of which first the topology of the original surface is determined with the aid of a three-dimensional scanning method, and the topological data thus determined and essentially containing the height values and depth values belonging to each surface element of a raster spanning the original surface, are stored in a first data record. Each surface element or raster element is assigned a measured depth value. A depth map of the original surface is thus produced. The basis of the inventive method in this case is the analysis and description of the reflection properties of an original surface, and thereafter the influencing and fashioning of the reflection properties of a three-dimensionally structured object surface.

Methods for producing three-dimensionally structured surfaces of objects are known, as are methods for assessing and/or analyzing the reflection behavior of surfaces.

Published, non-prosecuted German patent application DE 43 26 874 A1, corresponding to U.S. Pat. No. 5,886,317, discloses a method for engraving a pattern into the surface of a workpiece, in the case of which by optically or mechanically scanning a surface of a patterned original, an item of surface information is generated in the form of electrical control signals and stored, and is then used for controlling the engraving laser. In the region of the transitions or joints, in this case the surface information obtained from the patterned original there is multiply engraved on the workpiece as an identical pattern. There is no further description here of the actual design and control of the engraving laser.

The essence in the solution disclosed in published, non-prosecuted German patent application DE 43 26 874 A1 consists in that a copy of an original surface (patterned original) is to be made. Since this copy can be relatively large, depending on application, whereas the patterned original must, as a rule, be small, however, the copied surface of the patterned original must be laid alongside and above one another repeatedly in order to cover the required size of the workpiece to be machined. It is known that in the case of such multiply adjoining repetitions of copied surface transitions remain visible in the form of a report (for example as a repeating "patterning", as "patchwork" or as moulette streaks) if no special further machining is performed.

Some options for such machining are disclosed in the place cited. Thus, it is taught on the one hand for the identical surface information to be copied/applied multiply and/or alternately, or engraved in an inverse sequence of information—that is to say, forward and backward—and thus also to apply it with a certain randomness. Owing to such methods, although the transitions become somewhat softer, they remain visible as before, something which is often conspicuous in the form of a "chessboard effect", that is often to say a chessboard-type patterning.

A further disclosed principle consists solely in varying the detectability of the copy by having image parts removed, softened, modified and/or added. Here, as well, the edges of the image parts remain visible.

It is disadvantageous in the case of the method disclosed in published, non-prosecuted German patent application DE 43 26 874 A1 that the relevance of the locally different reflection properties of a surface are completely neglected, as is also the case with many other production methods. However, it is precisely with the chessboard effect that a repeating patterning or moulette streaks are conspicuous, particularly owing to a different optical reflection, or that they appear particularly strikingly for specific angles of light incidence.

One of the simplest methods for assessing or analyzing the reflection behavior of surfaces consists, for example, in determining a "degree of gloss" according to standardized measurement conditions, for example ISO 2813, in the case of which the optical radiation reflected at an angle of 60° from the surface is measured and is assigned to a classification in degrees of gloss from matt to glossy, depending on percentage reflection. However, such a degree of gloss describes merely the averaged glossability of the entire surface considered for a specific light ratio.

Moreover, methods exist in which a statement regarding the substance, the material of which the surface consists, is obtained by evaluating the reflection behavior of its surface. This is used, for example, when analyzing material samples such as liquids or powders, when examining welded joints or when controlling machining processes. Thus, published, non-prosecuted European patent application EP 618851 A1, corresponding to U.S. Pat. No. 5,281,798, exhibits a method for removing surface coatings/paints on a substrate, the method being controlled by the evaluation of a color difference of a reflected light such that only the coating to be eroded is removed, and the substrate itself is not damaged.

Concerning the production of artificial surface structures or surface coatings such as, for example, when producing artificial leather or plastic molded skins for parts of the inner cladding of motor vehicles, that is to say, for example, of door claddings or dashboards, methods are known in which the reflection properties of a reference surface/patterned surface are evaluated under controlled illumination, displayed with the aid of an image processing system and used as a basis for further control or working processes. It is peculiar to most of these methods of determination that the subjective evaluation of a practiced observer has so far been exclusively decisive between strongly or weakly reflecting subregions of a reference surface. Such a subjective evaluation can, however, disadvantageously only be transferred with insufficient accuracy into image processing or in automatic systems influencing the production process.

On the other hand, the subjective evaluation by the human eye is an extremely precise type of assessment of a structured surface that itself clearly registers very small variations in the appearance of the surface, and has so far not proved to be replaceable by automatic methods. Transitions or boundary regions that arise, for example, owing to the juxtaposition of subsegments to form a total surface, the formation of repeats and moulette streaks are just as conspicuous as different or "unnaturally" acting optical reflection and/or optical refraction, for example including the chessboard type patterning already mentioned. Moreover, there is the phenomenon that the human eye assesses a surface observed at a relatively large distance entirely otherwise than in the case of a viewing at a slight distance. Thus, it can happen that, for example, an artificial leather surface viewed in detail and from a slight distance appears completely regular whereas, when viewed from a distance of several meters, the same artificial leather surface is perceived as being uneven, streaky and unnaturally and strongly reflecting.

If, for example, it is wished to produce a plastic molded skin with a leather grain acting as naturally as possible, the reflection behavior plays a large role. When looking at a leather surface, the human eye is accustomed to a specific reflection behavior in the case of different light ratios, and reacts extremely dismissively to artificial leather surfaces which precisely lack just this reflection behavior. A dashboard that is covered with a plastic molded skin with a leather grain that unpleasantly reflects in sunlight is rejected by the consumer. This frequently leads to the fact that when such molded skins are produced an additional three-dimensional "artificial" structure that diminishes the reflection is impressed, for example in the form of a regular perforation. However, as a general rule the impression of a "genuine leather surface" is thereafter no longer present.

SUMMARY OF THE INVENTION

It is accordingly an object of the invention to provide a method for producing three-dimensionally structured surfaces that overcome the above-mentioned disadvantages of the prior art devices and methods of this general type, with the aid of which it is possible to produce three-dimensionally structured surfaces of objects (object surfaces) whose reflection properties can be objectively determined and can be influenced, including in relation to a pattern or to an original surface, and which, moreover, permits determined or desired reflection properties to be provided as control parameters for tools for surface machining, and which permits a transmission of the reflection properties in a fashion true to nature, and is also capable of adapting reflection properties of artificial surfaces to particular applications.

With the foregoing and other objects in view there is provided, in accordance with the invention, a method for producing three-dimensionally structured surfaces of objects, an object surface being generated as a reproduction of a three-dimensionally structured original surface with an aid of a machining tool. The method includes determining a topology of the original surface with an aid of a three-dimensional scanning method, and topological data thus determined and containing height values and depth values belonging to each surface element of a raster spanning the original surface, are stored in a first data record. The surface element or a raster element is assigned a measured depth value. The first data record is subjected to an assessment of the depth values with regard to their influence on reflection properties of surface elements. A reflection value is assigned as a parameter to each of the surface elements, depending on an assessment, and the refection value is stored in a second data record. The depth values of the first data record are revised in dependence on reflection values of the second data record resulting in revised depth values, and the revised depth values of the first data record are stored as topological data in a third data record and are used for electronically controlling the machining tool for machining the three-dimensionally structured object surface.

DETAILED DESCRIPTION OF THE INVENTION

The inventive solution includes:

b) first data record being subjected to an assessment of the depth values with regard to their influence on the reflection properties of the surface elements;

c) a reflection value being assigned as a parameter to each surface element, depending on the assessment, and is stored in a second data record;

d) depth values of the first data record being revised or modified as a function of the reflection values of the second data record; and e) a revised or modified depth values of the first data record being stored as topological data in a third data record and are used for electronically controlling a machining tool for machining the three-dimensionally structured object surface.

The first data record of topological data is therefore revised or corrected with the aid of the reflection values of the second data record, that is to say in a certain way measured and modified in terms of itself and/or in terms of its properties assessed from another point of view. Here, a reflection value is understood as a value or parameter that can characterize the reflection properties of a surface, that is to say, for example, a value that, as described below in more detail, represents the frequency of the occurrence of microscopically small edges.

Whereas the previously known production methods pay little heed to the reflection properties and at most include a subjective evaluation of the total surface via photos or image processing, the essential step in the case of the inventive solution consists in the coupling of the reflection properties of a surface to the macroscopic depth structure, actually present in the three-dimensional surface, in preferentially small surface elements. The inventive method thus generates a correlation of depth structure, that is to say topological map of the surface, and local reflection behavior, and makes this reflection behavior available in parametric form as basis for further machining of the object surface.

One advantageous development consists in that the method steps b) and c) are configured such that b) the first data record is subjected to an edge detection and subsequently an averaging with reference to the depth values; and c) the value that is obtained by the averaging and describes the frequency and/or height of the edges is assigned to each surface element a reflection value and is stored in a second data record.

Proceeding from the physical effect of the scattering of the light at edges, and from the reflectivity influenced thereby, of a randomly arranged number of edges, the solution found further here consists in rendering the method, known per se from image processing, of edge detection by specific mathematical operations, that is to say, for example, by Sobel or Laplace operators, useful for reflection analysis of three-dimensional surfaces by for the first time providing as data for the calculation actual and physically present depth information and/or depth differences, that is to say actual edges.

Specifically, in image processing to date all that has been performed is a two-dimensional viewing, detection and processing of "boundaries" within an image that have been formed by brightness differences. These boundaries are denoted as "edges" and their detection as "edge detection". Such an edge detection is used, for example, to detect or count on an assembly line objects that are to be machined and are photographed or filmed with the aid of a camera. Such a two-dimensional viewing is certainly sufficient for detecting two-dimensional spatial assignments, but not sufficient for the complicated structure of a three-dimensional surface, nor for the modeling of a reflection property to be derived therefrom.

One development consists in that the averaging is performed after the edge detection such that surface elements are combined into groups, and in each case edge frequencies and/or heights averaged inside the groups by proximity operations are assigned to the groups and stored in the second data record. For example, such an averaging is performed by a Gaussian filter as the operator. This yields a characterization or generalization by which the, if appropriate, greatly varying number and thickness/height of the edges are ascribed to appropriately homogenized reflection values that can be advantageous with regard to data volume and computing times in the further use of data to control processing machines.

One advantageous development consists in that a directionally dependent filtering is performed before the edge detection. By such a directionally dependent filtering that can be carried out with the aid of various mathematical operators, the statement regarding the reflectivity, which is oriented only toward edge height and edge frequency by the normal edge detection, is substantially refined to reflect that the reflection properties can likewise be represented objectively and measurably for different illumination conditions or angles of view.

A further advantageous development consists in that the filtering, in the case of edge detection, is performed by a directed Gaussian filtering. What is involved here is a simple operator that works rapidly and enables a sufficient number of directions to be represented with regard to their reflection properties within acceptable times.

A further advantageous development consists in that the method step d) is configured such that the depth values of the first data record, which are assigned to the surface elements or raster elements in the regions with a greatly varying reflection value, are removed from the first data record with the aid of exclusion criteria and are replaced by depth values of the first data record that originate from regions of the original surface without greatly varying reflection values. It is thereby possible for any fluctuations in reflection that may occur in regions in the original surface to be reduced during reproduction, that is to say in the object surface.

Thus, for example, individual excessively glossy locations can be taken out when processing the object surface in the case of genuine leather surfaces, that is to say can be "masked" as it were, and thereafter be produced/covered with structures of the remaining regions of the original surface that appear less "glossy".

A further advantageous development consists in that the greatly varying reflection values/parameters are classified and excluded with the aid of threshold values. It is thereby easily possible to set a, for example, uniformly low reflectance over the entire object surface, and thus to provide a "velvety" appearance.

A further advantageous development consists in that the method step d) is configured in such a way that, depending on the reflection properties occurring in regions on the original surface, the arrangement of the regions, split up into corresponding surface elements or raster elements, on the original surface is changed by changing the position on the object surface inside the raster element or surface element arrangement in the third data record such that discontinuities in the reflection properties of adjacent regions are minimized.

Starting from an original surface (pattern) that is heavily inhomogeneous and multifarious with regard to the reflection properties, it is thereby possible to construct/produce a homogeneous object surface, specifically by arranging and combining selected parts of the pattern in a manner similar to that in published, non-prosecuted German patent application DE 43 26 874 A1, but taking account here of the reflection properties of the edges and overlaps. Such an adaptation of the edges and overlaps can be performed in many sorts of ways, starting from manual methods or "quasi-manual" engraving using PC-aided image processing programs or drawing programs, as far as to structural synthesis methods and referred to depth structures.

A further advantageous development consists in that the method step d) is configured such:

i) that a fourth data record is stored that contains randomly generated reflection values for respectively associated raster elements and surface elements of a fictional object surface that is yet to be reproduced;

ii) that thereafter a number of adjacent random reflection values are combined to form a first subset by a first random reflection value of the object surface and are stored in a fifth data record, position and configuration of the adjacent reflection values likewise being stored by the coordinates of the respectively associated surface elements of the object surface;

iii) that thereafter the fifth data record is repeatedly compared with a sixth data record occupied by new data at each new comparison;

(1) there being stored in the sixth data record a second subset of adjacent measured reflection values of the original surface (that is to say reflection values of the second data record), and also the position and configuration of the adjacent reflection values of the original surface being stored by the coordinates of the respectively associated surface elements; and (2) the relative position and configuration of the adjacent reflection values of the first and second subsets being similar, preferably identical;

iv) that upon the achievement of a defined similarity between the reflection values of the first subset and the reflection values of the second subset, the first random reflection value of the fictional object surface is replaced by a second reflection value of the original surface (that is to say of the second data record) whose position and configuration with reference to the second subset corresponds to the position and configuration of the first reflection value with reference to the first subset;

v) that the method steps ii) to iv) are repeated frequently with different first and second subsets and for all reflection values of the object surface until all the reflection values of the object surface are successively replaced by reflection values from the original surface (that is to say from the second data record), the reflection values already replaced in the object surface with the aid of one or more preceding method steps iv) are also recorded in the first subset in order to carry out the method step ii) for comparison of the subsets in method step iii);

vi) that the method steps i) to v) are run through one or more further times after a replacement of all the reflection values of the object surface by reflection values of the original surface, the raster elements or surface elements respectively associated with the reflection values being reduced, in particular halved, at each further runthrough, and in method step v) the achievement of a defined similarity between the recent first subset and the adjacent reflection values already stored in the preceding runthrough of the method steps i) to v) being checked as a simultaneous further criterion; and vii) that the depth values of the first data record are revised and/or modified as a function of the reflection values of the object surface after achievement of a defined similarity between the object surface and the original surface.

It is thereby possible by use of a “random comparison” with the original surface to use reflection values or reflection properties that are already present as such somewhere in the original, but are “newly” assembled on an “infinitely” large surface in a new configuration. Thus, on the one hand, an unbounded object surface is generated with the aid of a machining tool as reproduction of a three-dimensionally structured finite original surface (patterned original) bounded by edges. On the other hand, there is no identical copy of the materially present pattern or original, but a “new” object surface is created that does, however, have the inherent properties of the original, here the inherent reflection properties.

In this case, individual regions of the “new” object surface are randomly selected, subjected to a comparison with similar regions of the original, and correspondingly adapted. All the locations of the original are used in principle in this case for the comparison.

Thus, the object surface is here first a type of fictional or synthetic intermediate original of a surface from which, specifically, the “finished” object surface is produced only after the processing steps according to the method.

The type/nature of the comparison carried out in this case is essential here. Specifically, a “neighborhood” of individual surface parts or surface points is viewed, that is to say a so-called “neighborhood comparison” is performed. In the course of such a “neighborhood comparison”, it is only the neighborhoods of individual surface parts or surface points that are intercompared, not the points themselves, for example. This criterion is then used to assume a more or less wide ranging identity of the surface points themselves (not viewed).

So that a starting or initial value proceeding from which the neighborhood comparison starts can be defined for the method, the “fourth” data record is occupied at the start of the method by arbitrary, randomly determined data.

Solely so as not to proceed from zero for reasons of calculation, this occupancy by data in each case exclusively includes a random, simple and single reflection property, for example an arbitrarily assumed relative edge frequency. The randomness of these reflection values is a result of the fact that the latter are taken from a random position of the first data record, but are present de facto somewhere or other on the original surface.

The comparison, already addressed above, of the surroundings, the neighborhoods as such, takes place between the “fictional” object surface and the original surface, the structure of the neighborhoods needing to be as similar as possible or the same. It is to be noted that the “neighborhoods” consist of respectively neighboring reflection values about a viewing point—likewise a reflection value—stored as a data record in the first and second subsets.

Once a defined similarity has been reached between the reflection values of the first and the reflection values of the second subsets, the first random reflection value of the object surface, that is to say the reflection value for the first viewed “point” of the object surface, is then replaced by a reflection value of the original surface, specifically the so-called “second” reflection value, whose position and configuration with reference to the second subset corresponds to the position and arrangement of the first reflection value with reference to the first subset.

It follows that a reflection value for a first “point” of the object surface is thereby replaced by a reflection value of another, that is to say a second “point” on the original surface. The criterion for the selection of the “replacement value” is in this case “suitable” neighborhoods from the object surface and the original surface, suitable, to be specific, with regard to their reflection properties and with reference to their position relative to the first and second points on the object surface and original surface. The “surroundings subset” (data record 5) from the object surface is thus compared with the “surroundings subset” from the original surface (data record 6). If the reflection values from a preceding processing step are to hand, these are also included as well in the criterion for the selection of the “replacement value”.

It is thereby possible to configure the production method such that, proceeding from the structural properties/reflection properties of a “small original”, these reflection properties grow anew/are produced anew on an “infinite” surface, but without being copied or generating pictorial repetitions.

Such a synthesis of a “reflection map” containing reflection values, and the surface structure constructed therefrom is, of course, compared once again and optimized taking account of a surface structure, generated from pure depth data, of a structural synthesis, for example a structural synthesis in accordance with German patent application DE 10 2005 022 969.5-32. In this case, the best interaction between the results of structural and reflection analyses is then determined as optimum, for example for a surface element. It is possible once again to make use in this case in a similar way of appropriately multidimensional comparison methods (neighborhood comparisons), as described above.

A further advantageous development consists in that the method step d) is configured in such a way that given translationally invariant reflection properties of the original surface, the surface elements or raster elements of the first data record are respectively assigned different reflection values and are stored in the second data record, after which the depth values of the first data record are modified as a function of the reflection values of the second data record. The term “surfaces with translationally invariant reflection properties” is understood to mean surfaces that in the extreme case exhibit the same reflection properties in each region, at each raster point of the surface. Such surfaces include the so-called “technical surfaces”, that is to say, for example, floor coverings for industrial installations that are stippled or provided with a honeycomb structure, or else plastic films as a covering for the interior of buses or trains. It is possible here to generate a higher level of “naturalness” subsequently by the modification of the reflection by the variation as a function of the “assigned” reflection values.

A further advantageous development consists in that the depth values of a further data record, which represents the reflection values of randomly arranged structural elements, are superposed on the depth values of the first data record. With the aid of this superposition, reflection properties of the first data record can be modified by the reflection properties of the second data record. A particularly natural effect is produced in this case by superposing the topological data/depth data of randomly distributed hair pores. The depth and the number of the hair pores, for example, can then be modified for the manipulation of the reflection properties.

It is likewise easily possible thereby to superpose more or less steep included angles on the topology, and thus the reflection values of corresponding flatter or deeper structural elements such as, for example, skin furrows, in order to modify the reflection properties.

A further advantageous development consists in that the reflection values and/or the topological data corresponding to them include a local modification of the microroughness, that is to say in essence a superposition of random microstructures/microdepressions. The reflection properties can also be seriously influenced thereby.

One advantageous development consists in that the so-called ray tracing method is used to determine the reflection properties/reflection values of actual three-dimensional structures by configuring the method steps b) and c) such that b) an optical radiation acting on the contour, characterized by the first data record of the depth values, of the original surface is described by a simulation model; and c) the reflection of the optical radiation is calculated from the depth discontinuities of the irradiated surface elements, assigned to a reflection value and stored in a second data record.

On the basis of the strictly physical alignment—and depending on the simulation model—this development of the method returns very good results in the objective description of the reflectivity, but necessitates a substantial outlay on computation, particularly in the case of the directionally dependent consideration.

The inventive method can be used for any type of method for producing artificial surfaces. The depth structures of a surface that are modified and thus optimized with regard to the reflection property can therefore be superposed as simple parameters on any basic depth scheme/structure scheme however produced in advance, and are therefore directly available as controlled variables.

The inventive method is suitable, in particular, for producing as object surfaces a plastic film with an embossed surface such as is used, for example, in motor vehicles as covering and imitation leather for a dashboard. Dashboards are subject to the most varied conditions of light and reflection and are intended as far as possible to produce no glare for the driver. Such a plastic film can be produced in the best possible way using the inventive method.

By way of example, the inventive method enables a leather selected for an executive automobile interior on the basis of its shape and embossment, for example water buffered leather, which although possessing a “robust impression” desired by the consumer, reflects unpleasantly on a dashboard given a specific incidence of light to be produced as a plastic molded skin with a reflection optimized depth structure, without influencing the overall impression desired.

The invention claimed is:

1. A method for producing three-dimensionally structured surfaces of objects, an object surface being generated as a reproduction of a three-dimensionally structured original surface with an aid of a machining tool, which comprises the steps of:

a) determining a topology of the original surface with an aid of a three-dimensional scanning method, and topological data thus determined and generally containing height values and depth values belonging to each surface element of a raster spanning the original surface, are stored in a first data record, the surface element or a raster element being assigned a measured depth value;

b) subjecting the first data record to an assessment of the depth values with regard to their influence on reflection properties of surface elements;

c) assigning a reflection value as a parameter to each of the surface elements, depending on an assessment, and storing the refection value in a second data record;

d) revising the depth values of the first data record in dependence on reflection values of the second data record resulting in revised depth values; and e) storing the revised depth values of the first data record as topological data in a third data record and are used for electronically controlling the machining tool for machining the three-dimensionally structured object surface.

2. The method according to claim 1, which further comprises:

performing step b) by subjecting the first data record to an edge detection and subsequently an averaging with reference to the depth values; and performing step c) by assigning a value that is obtained by the averaging and describes at least one of a frequency and a height of edges to each of the surface elements as a reflection value/parameter and is stored in the second data record.

3. The method according to claim 2, which further comprises performing the averaging after the edge detection such that the surface elements are combined into groups, and in each case at least one of edge frequencies and heights averaged inside the groups by proximity operations are assigned to the groups and stored in the second data record.

4. The method according to claim 2, which further comprises performing a directionally dependent filtering before the edge detection.

5. The method according to claim 4, which further comprises performing the directionally dependent filtering by a directed Gaussian filtering.

6. The method according to claim 2, wherein in step d) the depth values of the first data record, which are assigned to the surface elements or the raster elements in regions with a greatly varying reflection value, are removed from the first data record with the aid of exclusion criteria and are replaced by the depth values of the first data record that originate from regions of the original surface without greatly varying reflection values.

7. The method according to claim 6, which further comprises classifying and excluding the greatly varying reflection values with an aid of threshold values.

8. The method according to claim 1, wherein in the step d) depending on the reflection properties occurring in regions on the original surface, a configuration of the regions, split up into corresponding surface elements or corresponding raster elements, on the original surface is changed by changing a position on the object surface inside a raster element configuration or a surface element configuration in the third data record such that discontinuities in the reflection properties of adjacent regions are minimized.

9. The method according to claim 1, which further comprises performing the step d) by:

i) storing a fourth data record that contains randomly generated reflection values for respectively associated raster elements and surface elements of the object surface;

ii) subsequently combining a number of adjacent random reflection values to form a first subset by a first random reflection value of the object surface and are stored in a fifth data record, position and configuration of adjacent reflection values likewise being stored by coordinates of respectively associated surface elements of the object surface;

iii) subsequently repeatedly comparing the fifth data record with a sixth data record occupied by new data at each new comparison;

(1) storing in the sixth data record a second subset of adjacent measured reflection values of the original surface, and also the position and configuration of the adjacent reflection values of the original surface being stored by the coordinates of the respectively associated surface elements; and (2) the relative position and configuration of the adjacent reflection values of the first and second subsets are similar;

iv) that upon the achievement of a defined similarity between the reflection values of the first subset and the reflection values of the second subset, replacing the first random reflection value of a fictional object surface by a second reflection value of the original surface whose position and configuration with reference to the second subset corresponds to the position and configuration of the first reflection value with reference to the first subset;

v) repeating the steps ii) to iv) frequently with different first and second subsets and successively for all reflection values of the object surface until all the reflection values of the object surface are successively replaced by reflection values from the original surface, the reflection values already replaced in the object surface with the aid of at least one preceding method step iv) are also recorded in the first subset in order to carry out the method step ii) for comparison of the subsets in method step iii);

vi) running the steps i) to v) through at least one further time after a replacement of all the reflection values of the object surface by the reflection values of the original surface, the raster elements or the surface elements respectively associated with the reflection values being reduced, at each further runthrough, and in method step v) an achievement of a defined similarity between the recent first subset and the adjacent reflection values already stored in the preceding runthrough of the method steps i) to v) being checked as a simultaneous further criterion; and vii) revising the depth values of the first data record in dependence on the reflection values of the object surface after achievement of a defined similarity between the object surface and the original surface.

10. The method according to claim 1, wherein in that given translationally invariant reflection properties of the original surface, the surface elements or the raster elements of the first data record are respectively assigned different reflection values and are stored in the second data record, after which the depth values of the first data record are modified in dependence on the reflection values of the second data record.

11. The method according to claim 10, which further comprises superposing the depth values of a further data record, which represents the reflection values of randomly disposed structural elements, on the depth values of the first data record.

12. The method according to claim 11, which further comprises superposing the depth values/topological data obtained from the reflection values of randomly distributed hair pores on the depth values of the first data record.

13. The method according to claim 11, which further comprises obtaining the depth values/topological data of the further data record from the reflection values of a local variation in the microroughness.

14. The method according to claim 1, which further comprises performing the steps b) and c) as follows:

b1) providing an optical radiation to act on a contour, characterized by the first data record of the depth values, of the original surface is described by a simulation model; and c1) calculating the reflection of the optical radiation from depth discontinuities of irradiated surface elements, assigned to a reflection value and stored in the second data record.

15. The method according to claim 9, which further comprises:

during step iii(2), setting the relative position and configuration of the adjacent reflection values of the first and second subsets to be identical; and during step vi), reducing the reflection values in half.

16. A plastic film having an embossed surface, produced by the method according to claim 1.

* * * * *